April 20, 1948.  K. C. BUGG  2,440,074
FASTENER
Filed April 14, 1943
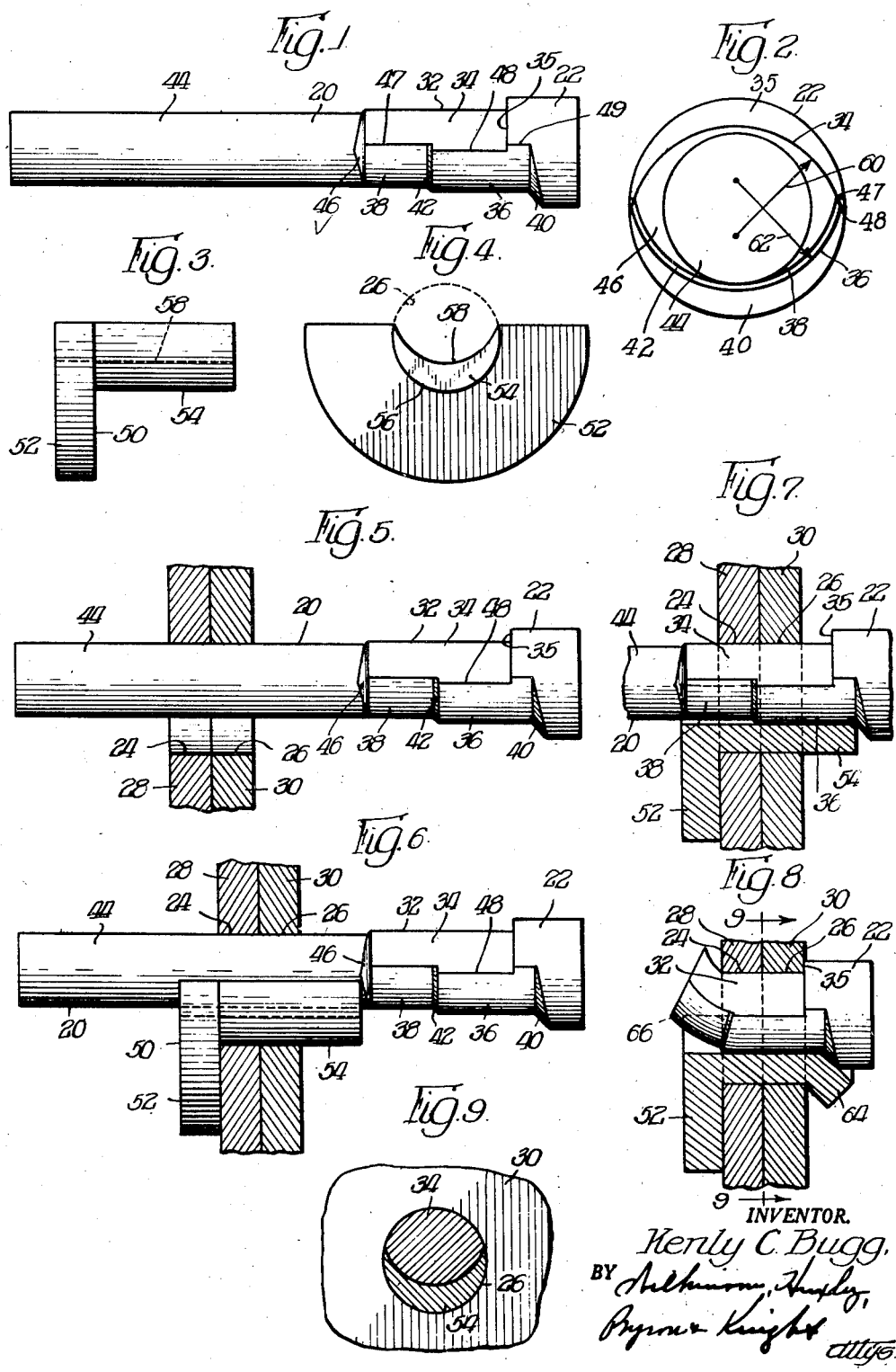
INVENTOR.
Henly C. Bugg.

Patented Apr. 20, 1948

2,440,074

UNITED STATES PATENT OFFICE 2,440,074

FASTENER

Kenly C. Burg, Fort Wayne, Ind.

Application April 14, 1943, Serial No. 483,050

16 Claims. (Cl. 85—38)

This invention pertains to fasteners, and more particularly to fasteners adapted to firmly hold parts together and adapted to be permanently applied and settable from only one side of the parts to be held by a single workman.

It is an object of this invention to provide a fastener which when positioned in holding relation to parts to be joined is locked firmly against vibration whereby it is particularly adapted for airplane or other vehicle use.

Another object is to provide a fastener adapted to be positioned in holding relation to parts to be joined from one side of said parts and by only one operator.

Yet another object is to provide a fastener adapted to be positioned in holding relation to parts to be joined and so constructed and arranged that when it is being positioned in holding relation, certain of the hole filling parts are opened or moved into tight engagement with the side of the holes, as distinguished from being upset or extruded within said holes, whereby harder materials with greater ultimate shear strength may be used, particularly where the fastener is set cold (not heated) and whereby the parts of the fastener may be made of material of the same or greater strength than the material or materials of the parts to be joined.

Still another object is to provide a fastener adapted to be positioned in holding relation to parts to be joined, and adapted to be set cold and without fracturing or damaging the fastener or diminishing its strength values.

A further object is to provide a fastener adapted to be positioned in holding relation to parts to be joined and so constructed and arranged that when it is being positioned in holding relation certain of the hole filling parts are opened or moved into tight engagement with the side of the holes, as distinguished from being upset or extruded within said holes, whereby the parts of the fastener may be made of the same materials.

Yet a further object is to provide a fastener adapted to be positioned in holding relation to parts to be joined wherein the parts are simple to manufacture, such as by coining, upsetting or the like, and wherein the parts do not need to be completely assembled nor exactly matched prior to use.

Still a further object is to provide a fastener adapted to be positioned in holding relation to parts to be joined and so constructed and arranged that the length of the fastener is immaterial as certain parts are opened into filling position in the holes, as distinguished from being extruded or upset in the holes, whereby a fastener is provided which is easy to apply yet is stronger and has more locked holding power than other types of fasteners which are applied from one side of the parts to be joined.

A different object is to provide a fastener adapted to be positioned in holding relation to parts to be joined and so constructed and arranged that the parts of the fastener may be made of the same material as the parts to be joined so as to reduce deflection of the joined parts to a minimum.

Yet a different object is to provide a fastener adapted to be positioned in holding relation to parts to be joined and so constructed and arranged that certain of the parts of the fastener open during setting to completely fill the hole of the parts to be joined, as distinguished from upsetting or extruding in setting, whereby the parts may be made of the same material as the parts to be joined so as to reduce deflection of the joined parts to a minimum.

Still a different object is to provide a fastener adapted to be positioned in holding relation to parts to be joined, so constructed and arranged that it can be set and locked under all usual fastening conditions such as where a countersunk, brazier or flat head is required.

Another different object is to provide a fastener adapted to be positioned in holding relation to parts to be joined, so constructed and arranged that in setting operation the head of one of the parts provides pointing means for the other of the parts, and wherein the head of one of the parts may be used as a fulcrum for locking the other part.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a side elevation of one part of the fastener embodying the invention, the same being hereinafter called the fastener stem;

Figure 2 is an enlarged end elevation of the fastener stem illustrated in Figure 1, the same looking toward the right as viewed in said figure;

Figure 3 is a side elevation of the other part of the fastener embodying the invention, the same being hereinafter called the shank or body;

Figure 4 is an end elevation of the shank or body illustrated in Figure 3, the same looking toward the right as viewed in said figure;

Figure 5 is a fragmentary elevation, partly in section, showing the insertion of the stem into aligned apertures of two articles to be fastened, such as plates, it being understood that the stem is applied from the left of said figure, as will be more particularly hereinafter described;

Figure 6 is a fragmentary elevation, partly in section, corresponding to Figure 5, showing the application of the shank or body through the aligned apertures after the stem has been applied as illustrated in Figure 5;

Figure 7 is a fragmentary elevation, partly in section, corresponding to Figures 5 and 6, showing the relative positions between the stem and shank just prior to the time that the stem is pulled into its fully set and locked position;

Figure 8 is a fragmentary elevation, partly in section, corresponding to Figure 7, showing the stem and shank in fully locked and set position; and Figure 9 is a transverse fragmentary sectional elevation taken substantially in the plane as indicated by line 9—9 of Figure 8.

Referring first of all more particularly to the stem 20 illustrated in Figures 1 and 2, the stem comprises a head 22, which is circular in plan (in the embodiment shown) as shown in Figure 2, the diameter of said head being substantially the same, that is, only slightly less than the diameter of the holes or apertures through the articles such as the plates to be fastened together. In other words, in the embodiment shown the head diameter is substantially the same as the diameter of the aligned apertures 24 and 26 of the plates 28 and 30.

The stem 20 is provided with the body portion 32 adjacent said head, the body portion 32 comprising sections or portions 34, 36 and 38, each bounded by a corresponding arcuate surface, said section 34 being so disposed with respect to the head as to form the shoulder 35 for engagement with an object to be secured said shoulder in the embodiment shown being in a radial plane with respect to the axis of the stem. Section 36 is connected to the head through the sloping upsetting (or pointing) section 40 which is a segment of a cone. The slope of the elements thereof is determined by the amount of pointing or upsetting desired to be applied to the body or shank 50 illustrated in Figures 3 and 4. The sections 36 and 38 are likewise connected by a conical segment or sloping portion 42 and the sections 34 and 38 are connected to the end 44 of the stem 20 by means of the substantially conical segment or sloping portion 46, the end 44 being substantially circular in section and of a less radius than the radius of the body portion 32. It will be seen by a reference to Figure 2 that segment 46 does not extend equally through 360° as it merges adjacent the bottom when the stem is held in the position shown in Figures 1 and 2. The arcuate surfaces etc. preferably intersect along a line disposed in a plane 48 extending through the center of the head 22 (and end 44). The intersection of sections 38 and 34, and section 36 and head 22 are along lines in co-extensive planes 47 and 49, respectively, which are preferably above plane 48.

The shank 50 comprises the head 52 which, in the embodiment shown, is substantially semi-circular in plan (Fig. 4), said head being provided with the shank body 54, the outer surface 56 of said shank body being of substantially the same radius as the radius of the apertures 24 and 26 and section 34. The inner wall 58 of said body member 54 is formed on a radius to give the proper wall thickness whereby when the shank member is applied through the apertures, the apertures are completely filled as illustrated in Figure 9. Having once determined the thickness of the wall of the body portion 54, the dimensions of the stem can readily be determined, that is, it will be seen by reference to Figure 9 that the shank body 54 fills a segment of the aperture. The upper segment not filled by the shank body 54 determines the proportions of the sections 34 and 36 of the stem. Thus it will be seen that the positions of the radii 60 and 62 are determined, these radii being struck from points so disposed that the sections 34 and 36 completely fill the hole, such as hole 26 (24). As a practical matter, said radii determining sections 34 and 36 are slightly larger than the unfilled portion of the apertures whereby the shank body 54 of the shank is squeezed and opened within the apertures to be filled when the completed fastener is in its set and locked position (Fig. 8) and completely and tightly fills the apertures of the parts to be connected (Fig. 9).

In fastening together articles such as sheets 28 and 30, the apertures 24 and 26 are disposed in alignment. The stem is then inserted through the apertures 24 and 26 (from left to right, Fig. 5), the head 22 being passed through said apertures and the body portion 32 being disposed inwardly of the sheet 30 such as shown in Fig. 5. The shank 50 is then inserted to a position where the inside surface of the head 52 contacts the sheet 28 such as illustrated in Figure 6 at which time the shank body 54 extends through said apertures. A suitable tool is then used to grasp the end 44 of the stem, and may seat upon the head 52 to retain it in its position illustrated in Figure 6. The stem is then drawn toward the left as viewed in Figures 5 and 6, the surface 46 preferably contacting the sheet 30 adjacent the edge of the aperture 26 slightly prior to contact between the surface 42 and the inner arcuate surface of the body 54 of the shank 50. This forces the body portion 32 of the stem toward the body 54, and continued movement causes the lower section 36, acting between the upper section 34, to squeeze and open the body 54 in the apertures.

The pointing or upsetting section 40 contacts the body 54 as shown in Figure 7, and continued inward movement of the head 22 causes the protruded portion of the body 54 to be pointed or upset as shown at 64 in Figure 8. This pointing continues until the inner surface of the head 22 contacts the plate 30 such as shown in Figure 8. At this time the tool may be conveniently fulcrumed, such as against the head 52, to permit the end of the body portion 32 adjacent the shank of the end 44 to be bent to the position as shown at 66 in Figure 8, at which time the end 44 of the stem can be sheared off. It will thus be seen that the shank is upset (pointed) or locked as at 64, and the stem is locked as at 66, completing the fastening operation.

It is to be understood that I do not wish to be limited by the exact embodiments of the device shown, which are merely by way of illustration and not limitation as various and other forms of the device will, of course, be apparent to those skilled in the art without departing from the spirit of the invention or the scope of the claims.

I claim:

1. A fastener adapted to secure a pair of objects together, said objects having aligned apertures, said fastener comprising a stem having a head engageable with one of said objects and a body portion extending through said apertures, said head being of slightly less size than said apertures whereby it is insertable therethrough, and a shank having a head engageable with the other of said objects and having a shank body extending through said apertures, said shank body and stem filling said apertures a portion of the body portion of said stem being adapted to be positioned to engage said other of said objects.

2. A fastener adapted to secure a pair of objects together, said objects having aligned apertures, said fastener comprising a stem having a head engageable with one of said objects and a body portion extending through said apertures, said head being of slightly less size than said apertures whereby it is insertable therethrough, the body portion having sections of different size connected by sloping portions, and a shank having a head engageable with the other of said objects and having a shank body extending through said apertures, said shank body and stem filling said apertures.

3. A fastener adapted to secure a pair of objects together, said objects having aligned apertures, said fastener comprising a stem having a head engageable with one of said objects and a body portion extending through said apertures, said head being of slightly less size than said apertures whereby it is insertable therethrough, the body portion having sections of different size connected by sloping portions, and a shank having a head engageable with the other of said objects and having a shank body extending through said apertures, said shank body and stem filling said apertures when said body portion is pulled toward the head of said second named head.

4. A fastener adapted to secure a pair of objects together, said objects having aligned apertures, said fastener comprising a stem having a head engageable with one of said objects and a body portion extending through said apertures, said head being of slightly less size than said apertures whereby it is insertable therethrough, the body portion having sections of different size connected by sloping portions, and a sloping portion connecting one of said sections and said head, and a shank having a head engageable with the other of said objects and having a shank body extending through said apertures, said shank body and stem filling said apertures when said body portion is pulled toward the head of said second named head, the second named sloping portion causing the end of said shank body to be upset.

5. A fastener adapted to secure a pair of objects together, said objects having aligned apertures, said fastener comprising a stem having a head engageable with one of said objects and a body portion extending through said apertures, said head being of slightly less size than said apertures whereby it is insertable therethrough, the body portion having sections of different size connected by sloping portions, and a sloping portion connecting one of said sections and said head, and a shank having a head engageable with the other of said objects and having a shank body extending through said apertures, said shank body and stem filling said apertures when said body portion is pulled toward the head of said second named head, the second named sloping portion causing the end of said shank body to be upset radially, said body portion being adapted to be turned radially and cut off at a predetermined point whereby the fastener is caused to fasten together said objects.

6. A two part fastener comprising a stem, said stem including a head of slightly less cross section than the section of the apertures through which said head is adapted to be inserted, a body portion adjacent said head, said body portion including contiguous sections, one of said sections being connected to said head by a radial plane, another of said sections being connected to said head by a sloping portion, and a third section connected to said second section by a sloping portion, an end, said end being connected to said first and third named sections through a sloping portion, said second and first sections having the same radii, and a shank having a shank body, said shank body being adapted to be engaged by said sloping portions and said sections to expand said shank body to hole filling condition and to upset the end of said shank body, the outside radius of said shank body being the same as said radii.

7. The stem of a two part fastener, said stem including a head of slightly less cross section than the section of the apertures through which said head is adapted to be inserted, a body portion adjacent said head, said body portion including contiguous sections, one of said sections being connected to said head by a radial plane, another of said sections being connected to said head by a sloping portion, and a third section connected to said second section by a sloping portion, an end, said end being connected to said first and third named sections through a sloping portion.

8. The stem of a two part fastener, said stem including a head of slightly less cross section than the section of the apertures through which said head is adapted to be inserted, a body portion adjacent said head and said body portion including contiguous sections, one of said sections being connected to said head by a radial plane, another of said sections being connected to said head by a sloping portion, and a third section connected to said second section by a sloping portion, an end, said end being connected to said first and third named sections through a sloping portion, said second and first sections having the same radii.

9. A two part fastener comprising a stem, said stem including a head of slightly less cross section than the section of the apertures through which said head is adapted to be inserted, a body portion adjacent said head, said body portion including contiguous sections, one of said sections being connected to said head by a radial plane, another of said sections being connected to said head by a sloping portion, and a third section connected to said second section by a sloping portion, an end, said end being connected to said first and third named sections through a sloping portion, and a shank having a shank body, said shank body being adapted to be engaged by said sloping portions and said sections to expand said shank body to hole filling condition and to upset the end of said shank body.

10. A two part fastener comprising a stem, said stem including a head of slightly less cross section than the section of the apertures through which said head is adapted to be inserted, a body portion adjacent said head, said body portion including contiguous sections, one of said sections being connected to said head by a radial plane, another of said sections being connected to said head by a sloping portion, and a third section connected to said second section by a sloping portion, an end, said end being connected to said first and third named sections through a sloping portion, the planes between said third and first sections and between said head and second section extending through the axis of said stem, the plane between said first and second sections being parallel to said other planes but offset therefrom, and a shank having a shank body, said shank body being adapted to be engaged by said sloping portions and said sections to expand said shank body to hole filling condition and to upset the end of said shank body.

11. A two part fastener comprising a stem, said stem including a head of slightly less cross section than the section of the apertures through which said head is adapted to be inserted, a body portion adjacent said head, said body portion including contiguous sections, one of said sections being connected to said head by a radial plane, another of said sections being connected to said head by a sloping portion, and a third section connected to said second section by a sloping portion, an end, said end being connected to said first and third named sections through a sloping portion, the planes between said third and first sections and between said head and second section extending through the axis of said stem, the plane between said first and second sections being parallel to said other planes but offset therefrom, said second and first sections having the same radii, and a shank having a shank body, said shank body being adapted to be engaged by said sloping portions and said sections to expand said shank body to hole filling condition and to upset the end of said shank body.

12. A two part fastener comprising a stem, said stem including a head of slightly less cross section than the section of the apertures through which said head is adapted to be inserted, a body portion adjacent said head, said body portion including contiguous sections, one of said sections being connected to said head by a radial plane, another of said sections being connected to said head by a slopping portion, and a third section connected to said second section by a sloping portion, an end, said end connected to said first and third named sections through a sloping portion, the planes between said third and first sections and between said head and second section extending through the axis of said stem, the plane between said first and second sections being parallel to said other planes but offset therefrom, said second and first sections having the same radii, and a shank having a shank body, said shank body being adapted to be engaged by said sloping portions and said sections to expand said shank body to hole filling condition and to upset the end of said shank body, the outside radius of said shank body being the same as said radii.

13. A stem of a two part fastener comprising a head and a body portion adapted to perform a fastening function, said body portion having a plurality of sections formed by intersecting arcuate surfaces, the axes of the radii of certain of the arcuate surfaces being at points upon a diameter of the stem at opposite sides of the center thereof, said arcuate surfaces being disposed between a prolongation of the peripheral surface of the head and the axis of the stem, one of the surfaces of the sections being common to plurality of different sections.

14. A stem of a two part fastener comprising a head and a body portion adapted to perform a fastening function, said body portion having a plurality of sections formed by intersecting arcuate surfaces, the axes of the radii of certain of the arcuate surfaces being at points upon a diameter of the stem at opposite sides of the center thereof, certain of said surfaces being disposed at different distances from the axis of the stem, said acruate surfaces being disposed between a prolongation of the peripheral surface of the head and the axis of the stem, one of the surfaces of the sections being common to a plurality of different sections.

15. A stem of a two part fastener comprising a head and a body portion adapted to perform a fastening function, said body portion having a plurality of sections formed by intersecting arcuate surfaces, the axes of the radii of certain of the arcuate surfaces being at points upon a diameter of the stem at opposite sides of the center thereof, said arcuate surfaces being disposed between a prolongation of the peripheral surface of the head and the axis of the stem, one of the surfaces of the sections being common to a plurality of different sections, said surfaces being disposed in planes the elements of which are parallel to the axis of the stem.

16. A stem of a two part fastener comprising a head and body portion, said body portion having a plurality of sections formed by intersecting arcuate surfaces, the axes of the radii of certain of the arcuate surfaces being at points upon a diameter of the stem at opposite sides of the center thereof, one of the surfaces being common to a plurality of different sections.

KENLY C. BUGG.

REFERENCES CITED

The following references are of record in the file of this patent:

UNITED STATES PATENTS

| Number | Name | Date |
| --- | --- | --- |
| 1,404,955 | Haug | Jan. 31, 1922 |
| 1,426,098 | Pruitt | Aug. 15, 1922 |
| 2,230,916 | Tinnerman | Feb. 4, 1941 |
| 2,322,852 | Kost | June 29, 1943 |

FOREIGN PATENTS

| Number | Country | Date |
| --- | --- | --- |
| 4,171 | Great Britain | Feb. 19, 1912 |
| 113,926 | Great Britain | Mar. 14, 1918 |